J. P. Kintner,

Cotton Press.

No. 89,411.  Patented Apr. 27, 1869.

Witnesses.  
E. Naegelin  
L. Hewitt

Inventor.  
James P. Kintner.

JAMES P. KINTNER, OF HARRISON COUNTY, INDIANA.

*Letters Patent No. 89,411, dated April 27, 1869.*

IMPROVED SCREW FOR COTTON AND HAY-PRESSES.

The Schedule referred to in these Letters Patent and making part of the same.

*To all whom it may concern:*

Be it known that I, JAMES P. KINTNER, of Harrison county, in the State of Indiana, have invented a new and useful Improvement in Cotton and Hay-Press Screws; and I do hereby declare that the following is a full, clear, and exact description thereof.

The nature of which consists in a male and female screw, one working within the other, the former having a fine-pitch right-hand thread, while the latter has a coarse-pitch left-hand thread, and by the combination of the right and left-hand screws, I produce the combined upward motion of both screws at the same time by means of the revolving female screw, and as but little power is required at first, the upward motion is very rapid for about half the distance, or until the female screw has run its length, after which the nut in which it revolves will be locked to it by an automatic spring-latch on the side of the collar, with its arrangements for that purpose, after which they will still act as a nut, or female, to the fine thread, or male screw, running it up to its termination with a slower motion, but with a corresponding increase of power at the point where it is wanted. The nut of the female screw has a strong flange on the lower end, as a base against which the power of the press operates, and when in operation, revolves on a plate on the top of the press-frame.

The female screw passes down through the frame, about half its length, with that part turned off, neatly, and two keys, or ribs, inserted, one on either side, running parallel with the screw the length of the plain part, and to which the hub of the lever-flange is fitted by being bored out neatly, and grooves cut in the inside, corresponding with the keys in the female screw by which it is driven; said lever-flange being held up by a flange on the upper end of the hub, which is kept in its place by hooks screwed to the side of the press-frame.

The above improvement further consists in the coarse-pitch left-hand thread on the large screw, and the fine-pitch right-hand thread on the small screw, which greatly diminish the angle of the thread on the screws, and thereby greatly reduce the friction consequent upon a *vice versa* arrangement.

To enable others skilled in the art to make and use my invention, I will proceed to describe its construction and operation by reference to the drawings, and to the letters of reference marked thereon.

Figure 1:
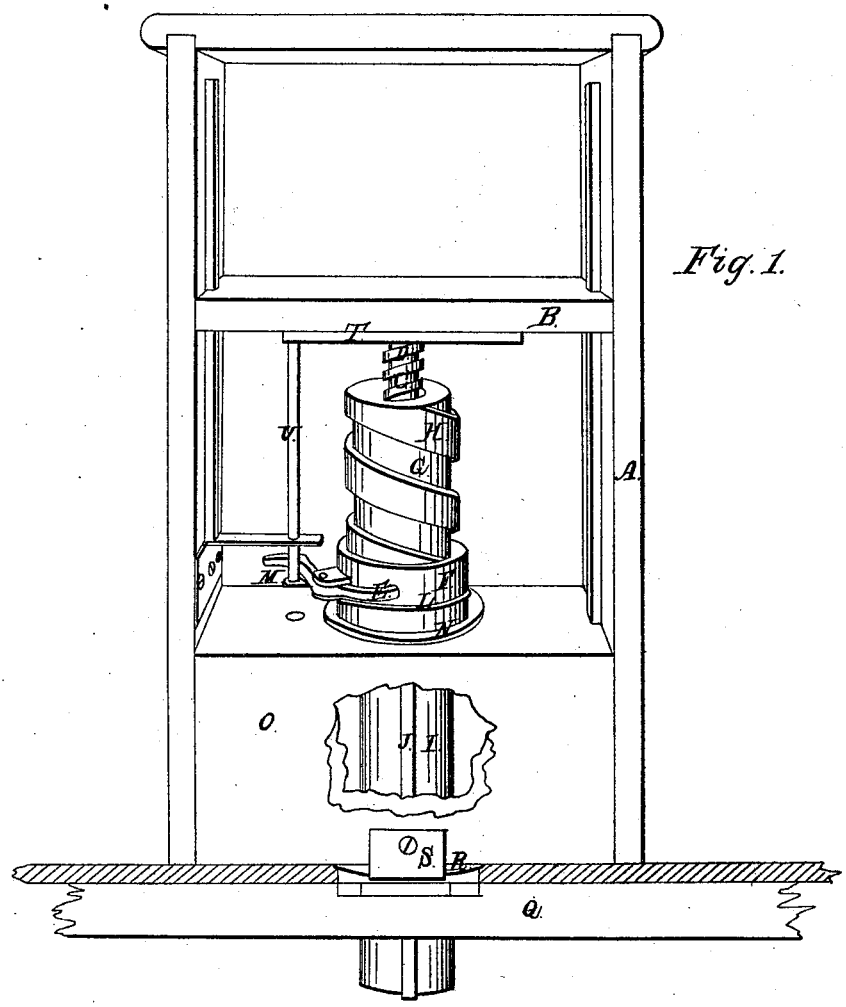

Figure 1 is a perspective view of the press and screws, showing how they are arranged in the frame.

A is the frame, which is made of wood.

B is the follow-block, to which the head of the male screw C is attached, and by which the bale is pressed against the hammer.

T is the head of the screw attached to the follow-block.

C is the male screw, which is made of iron, with a fine-pitch right-hand thread.

D is the thread on the same; but this thread may be made left-handed, provided the thread of the female screw, G, is the reverse also.

U is the trip-rod, which operates the automatic latch E, on the side of the nut, or collar, F.

G is the female screw, which is also made of iron, with a coarse-pitch left-hand thread on the outside, and a fine-pitch right-hand thread on the inside to act as a nut for the male screw C. The outside thread runs only about half the length of the screw, the remaining part is plain, with keys set, permanently, in either side, by which it is driven.

H is the left-hand thread on the female screw.

I is the plain part of the same.

J J are the keys, or ribs, set in either side, by which it is driven.

F is the collar, or outside nut of the female screw G.

N is the flange, or rim on the same.

E is the automatic latch, on the side which locks it to the female screw when it has run its length.

L is the spring-latch which holds it in its place.

M is the pin which holds it up.

O is the base-beam of the press-frame, against which the power of the press operates.

P is the plate on the top of the same, on which collar N revolves.

Q is the lever and flange by which the press is operated.

R is the flange, or projection, on the top of the hub, by which it is held up, and which revolves on the hooks S S, screwed to the block O above, by which it is held up.

Figure 2:
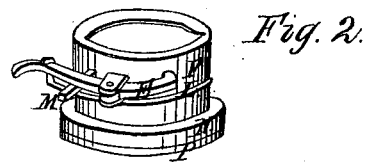

Figure 2 is a view of the outside nut, or collar F, of the female screw, showing the latch E, and the spring L, and pin M, and flange N.

The above is a description of the construction of the above improvement, and its operation consists in filling the bale-box above with hay, or cotton, after which apply power to the lever Q, which causes the female screw, G, to revolve and run up its length, rapidly, and as it acts as a nut to the male screw, it also is run up at the same time, but with less speed; and after the female screw, G, has run its length, it is locked to the collar, or nut, F, by the latch E dropping into a catch in the thread of the screw G, causing them to act as a nut, or female to the male screw C, running it up to its termination with slower motion, but with a corresponding increase of power at the last point where it is necessary to complete the bale; therefore I do not claim the male and female screws; but

What I claim as my invention, or improvement, and desire to secure by Letters Patent, is—

The arrangement of the female screw G, male screw C, in combination with the outside nut, or collar, F, when used on top of the base-block O, provided with the automatic spring-latch E, and the spring L, pin M, and trip-rod U, with its supports attached to the frame, all constructed and operating substantially as herein set forth.

JAMES P. KINTNER.

Witnesses:
E. NAEGELIRS,
L. HEWITT.